United States Patent
Bertrand et al.

(10) Patent No.: US 11,719,971 B1
(45) Date of Patent: Aug. 8, 2023

(54) GROUND FEATURE IN A CAPACITIVE TOUCH SYSTEM

(71) Applicant: Cirque Corporation, Sandy, UT (US)

(72) Inventors: Jon Bertrand, Taylorsville, UT (US); Paul Glad, Sandy, UT (US); Douglas Steck, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/654,415

(22) Filed: Mar. 11, 2022

Related U.S. Application Data

(63) Continuation-in-part of application No. 17/665,699, filed on Feb. 7, 2022.

(51) Int. Cl.
 *G02F 1/1333* (2006.01)
 *G06F 3/044* (2006.01)
 *G06F 3/041* (2006.01)

(52) U.S. Cl.
 CPC .... *G02F 1/133334* (2021.01); *G02F 1/13338* (2013.01); *G06F 3/0412* (2013.01); *G06F 3/0416* (2013.01); *G06F 3/0446* (2019.05); *G06F 2203/04107* (2013.01)

(58) Field of Classification Search
 CPC ...... G06F 3/0446; G06F 3/044; G06F 3/0416; G06F 3/0412; G06F 2203/04107; G06F 3/04166; G06F 3/0445; G06F 3/0443; G06F 3/0448; G06F 3/04144; G06F 3/04184; G06F 3/1662; G02F 1/13338; G02F 1/133334; G02F 1/136204
 See application file for complete search history.

(56) References Cited

U.S. PATENT DOCUMENTS

| | | |
|---|---|---|
| 5,856,822 A | 1/1999 | Du |
| 6,188,391 B1 | 2/2001 | Seely |
| 6,380,930 B1 | 4/2002 | Van Ruymbeke |
| 8,743,083 B2 | 6/2014 | Zanone |
| 8,988,628 B2 | 3/2015 | Martisauskas |
| 9,223,352 B2 | 12/2015 | Smith |
| 9,323,399 B2 | 4/2016 | Osoinach |
| 10,425,079 B1* | 9/2019 | Bytheway ............ H03K 17/955 |
| 10,606,323 B1 | 3/2020 | Chang |
| 2013/0162594 A1 | 6/2013 | Paulsen |
| 2013/0341409 A1* | 12/2013 | Wu ......................... G06F 1/169 |
| | | 235/492 |
| 2014/0139239 A1* | 5/2014 | Zachut .................. G06F 3/0448 |
| | | 324/658 |
| 2014/0253830 A1 | 9/2014 | Li |
| 2016/0124574 A1 | 5/2016 | Rouaissia |
| 2018/0032166 A1 | 2/2018 | Orihara |
| 2019/0148988 A1 | 5/2019 | Hwang |
| 2020/0393715 A1* | 12/2020 | Ge ....................... G02F 1/13338 |

FOREIGN PATENT DOCUMENTS

KR 20140030365 A * 3/2014 ... G06F 2203/04107

* cited by examiner

*Primary Examiner* — Darlene M Ritchie

(57) ABSTRACT

An apparatus may include a touch sensor where the touch sensor has a first set of electrodes and a second set of electrodes that are electrically isolated from the first set of electrodes, a shield layer positioned adjacent to the touch sensor where the shield layer has a first section and a second section where the first section of the shield layer has a different electrical characteristic than the second section of the shield layer, and a ground feature incorporated into the touch sensor.

13 Claims, 19 Drawing Sheets

GROUND FEATURE IN A CAPACITIVE TOUCH SYSTEM

CROSS REFERENCE TO RELATED APPLICATIONS

The present Application is a Continuation-in-Part of U.S. patent application Ser. No. 17/665,699 by Jon Bertrand et al entitled "Shield for a Capacitive Touch System," filed on Feb. 7, 2022. U.S. patent application Ser. No. 17/665,699 is a Continuation of U.S. patent application Ser. No. 16/713,677 by Jon Bertrand et al., entitled "Radio Frequency Transparent Capacitive Touch Systems and Methods," filed on Dec. 13, 2019. U.S. patent application Ser. No. 16/713,677 claims priority to U.S. Provisional Patent Application No. 62/794,392 by Jon Bertrand et al., entitled "Radio Frequency Transparent Capacitive Touch Systems and Methods," filed on Jan. 18, 2019. Each of these applications are assigned to the assignee hereof, and expressly incorporated by reference herein.

FIELD OF THE DISCLOSURE

This disclosure relates generally to capacitive sensors, such as a touch pad, touch screen, a proximity sensor, or another type of touch capacitive sensor, and methods of operation. More particularly, this disclosure relates to systems and methods with a ground feature incorporated into the capacitance sensor.

BACKGROUND

Touch pads are often included on processor-based devices, such as laptop computers or the like, in order to allow a user to use fingers, styli, or the like as a source of input and selection. Additionally, processor-based devices often include radio frequency (e.g., 3 MHz-30 GHz) transmitters, receivers, transceivers, or the like (collectively, "transceivers" herein) for Wi-Fi, Bluetooth, near field communications (NFC), or the like. However, capacitive touch pads often require electrical shielding to prevent noise from the processor-based device from interfering with normal touch pad functions. When in proximity to the radio transceiver that shielding may prevent transmission and reception of the radio frequencies.

For example, a touch pad might be the only opening in the chassis of a processor-based device (such as a laptop) and that single opening may be used for multiple purposes, such as sending and receiving Wi-Fi or NFC communications. Existing devices may place the radio frequency antenna near (e.g., underneath) the touch pad and hatch the touch pad ground plane shielding to allow some of the radio frequencies through the shielding. However, this approach often requires tuning the antenna to transmit through the shielding and tuning is often difficult. Further, the antenna system will likely waste more power than a typical installation and the performance of the touch pad may be still affected. Additionally, the above-described system may be more difficult to manufacture due to variations in the touch pad printed circuit board (PCB) affecting the antenna resonance. Other drawbacks, inconveniences, and issues with existing devices and methods also exist.

SUMMARY

In some embodiments, an apparatus may include a touch sensor where the touch sensor has a first set of electrodes and a second set of electrodes that are electrically isolated from the first set of electrodes, a shield layer positioned adjacent to the touch sensor where the shield layer has a first section and a second section where the first section of the shield layer has a different electrical characteristic than the second section of the shield layer, and a ground feature incorporated into the touch sensor.

The first set of electrodes and the second set of electrodes may be formed on the same layer.

The first set of electrodes may be formed on a first layer and the second set of electrodes may be formed on a second layer.

The first layer may include a first portion of the ground feature and the second layer may include a second portion of the ground feature where the first portion and the second portion are electrically connected to each other.

The first portion of the ground feature and the second portion of the ground feature may have different widths.

The apparatus may include a pixel layer incorporated into a stack of layers that includes the touch sensor and the shield layer.

The first section of the shield layer may include multiple openings defined in the thickness of the first section and the second section of the shield layer has a solid continuous area.

The first section of the shield layer may include multiple openings defined in the thickness of the first section and the second section of the shield layer may include a second set of openings defined in the thickness of the second section where the first set of openings have different dimensions than the second set of openings.

The first section of the shield layer may include multiple openings defined in the thickness of the first section and the second section of the shield layer may include a second set of openings defined in the thickness of the second section where the first set of openings have a different spacing than the second set of openings.

The ground feature may be a ring that surrounds at least a region of the touch sensor.

Only a portion of the ring may be formed on a perimeter of the touch sensor.

The ring may include at least one discontinuity.

At least a portion of the ground feature may divide a first region of the touch sensor from a second region of the touch sensor where the first region of the touch sensor aligns with the first section of the shield layer and the second region of the touch sensor aligns with the second region of the shield layer.

The first region of the touch sensor may be adjacent to an antenna configured to direct a radio frequency signal through the first region of the touch sensor.

The apparatus may include a component layer and a ground connection formed on the component layer configured to connect to a frame of computing device where the ground feature is electrically connected to the ground connection.

In some embodiments, an apparatus may include a touch sensor, a shield layer positioned adjacent to the touch sensor where the shield layer has a first section and a second section where the first section of the shield layer has a different electrical characteristic than the second section of the shield layer, and a ground feature incorporated into the touch sensor. At least a portion of the ground feature may divide a first region of the touch sensor from a second region of the touch sensor where the first region of the touch sensor aligns with the first section of the shield layer and the second region of the touch sensor aligns with the second region of the shield layer.

The apparatus may include a component layer and a ground connection formed on the component layer configured to connect to a frame of computing device where the ground feature is electrically connected to the ground connection.

The first region of the touch sensor may be adjacent to an antenna configured to direct a radio frequency signal through the first region of the touch sensor.

Only a portion of the ring may be formed on a perimeter of the touch sensor.

The ring may include at least one discontinuity.

Figure 1:
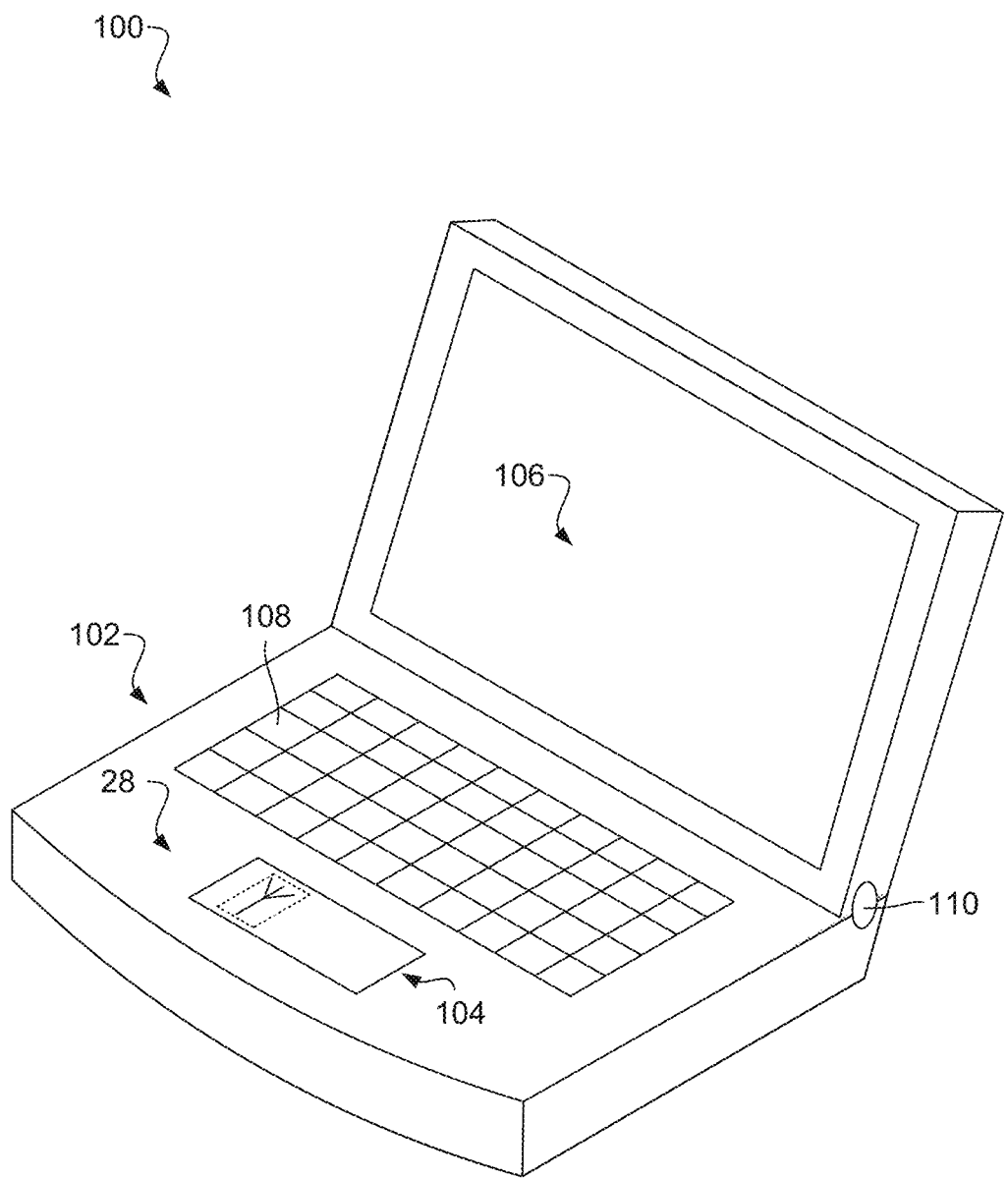
FIG. 1 depicts an example of a computing device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, and the term "Rx" generally refers to a sense line.

It should be understood that use of the terms and "touch sensor" throughout this document may be used interchangeably with "capacitive touch sensor," "capacitive sensor," "capacitive touch and proximity sensor," "proximity sensor," and "touch and proximity sensor." Such a touch sensor may be incorporated into a touch panel, a computing device, a touch screen, a touch pad, a mobile device, an electronic tablet, a phone, another electronic device, or combinations thereof. The touch sensor may be incorporated into a stack of layers that also include a shield layer, component layer, blank layers, other types of layers, or combinations thereof. In some cases, the touch sensor may be one of the layers of the stack or compose multiple layers of the stack.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the electronic device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a keyboard housing (i.e., the surface containing the keyboard 102). In some examples, the touch pad 104 is located in an area of the keyboard's surface where the user's palms may rest while typing. In some cases, the touch pad is visual through an opening formed in the key board housing. In other examples, the touch pad is located underneath the keyboard and touches to the areas of the keyboard housing that are positioned over the touch pad may be detected by the touch pad. In such examples where the keyboard housing functions as the touch surface of the touch pad, the keyboard housing may have at least a section adjacent to the touch pad stack that is electrically non-conductive to allow electrical signals to be detected on the touch pad. In some examples, a section of keyboard housing that is electrically non-conductive may include a glass material, a plastic material, a dielectric material, another type of material, or combinations thereof.

The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 110. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positional at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

While the example of FIG. 1 depicts an example of the portable electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, another type of portable electronic device, another type of device, or combinations thereof.

Figure 2:
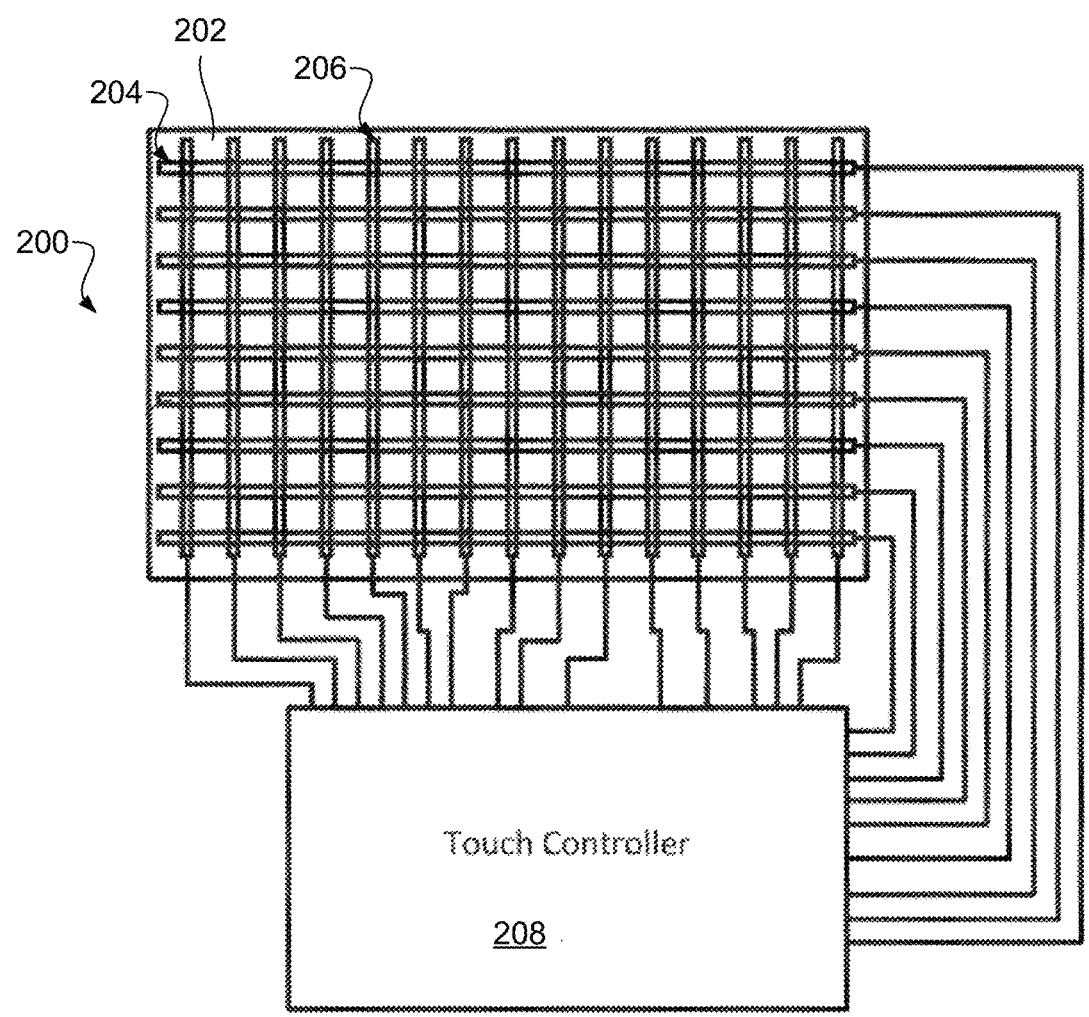
FIG. 2 depicts an example of a touch controller in accordance with the disclosure.

In the example depicted in FIG. 1, an antenna 112 is positioned proximate the touch pad 104. In the antenna 112 may be positioned in any approximate with respect to the touch pad 104. For example, the antenna may be positioned underneath the touch pad, to the side of the touch pad, FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The touch input component 200 may include one or more electrodes in the first set 204 or the second set 206. Such a substrate 202 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 208 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

Figure 3:
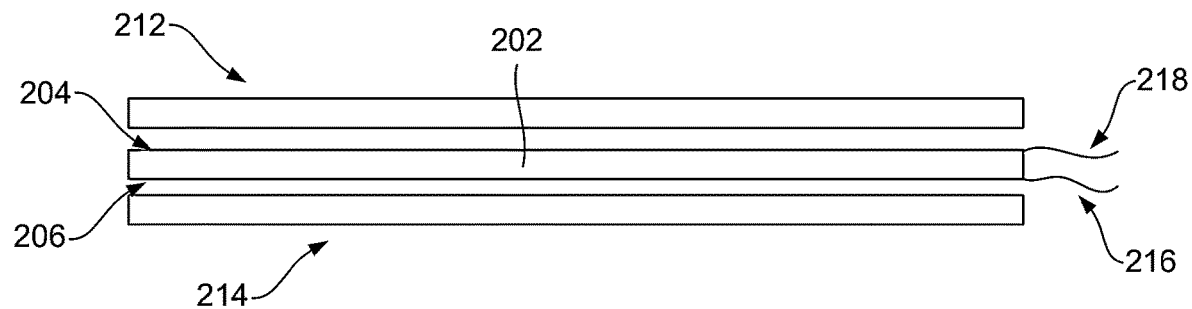
FIG. 3 depicts an example of a touchpad in accordance with the disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a touch pad, the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
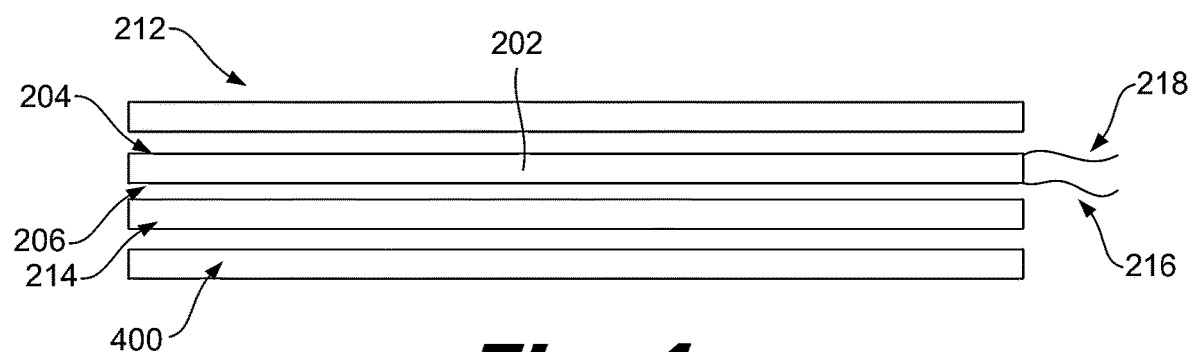
FIG. 4 depicts an example of a touchpad in accordance with the disclosure.

FIG. 4 depicts an example of a touch screen as the touch input controller. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the touch surface 212 may all be at least partially transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

In some examples, an antenna positioned near a touch sensor may radiate radio frequency signals that are detectable by the touch sensor and thereby interfere with the touch or proximity measurements made with the touch sensor. The shield 214 may block the signals from the antenna and other components within a laptop or other type of computing device. However, blocking the antenna signal with the shield restricts the space through which the antenna can broadcast. Often, the antenna's signal is increased to compensate because of the effects of the shield, which in turn increases the amount of energy needed to operate the computing device.

Figure 5:
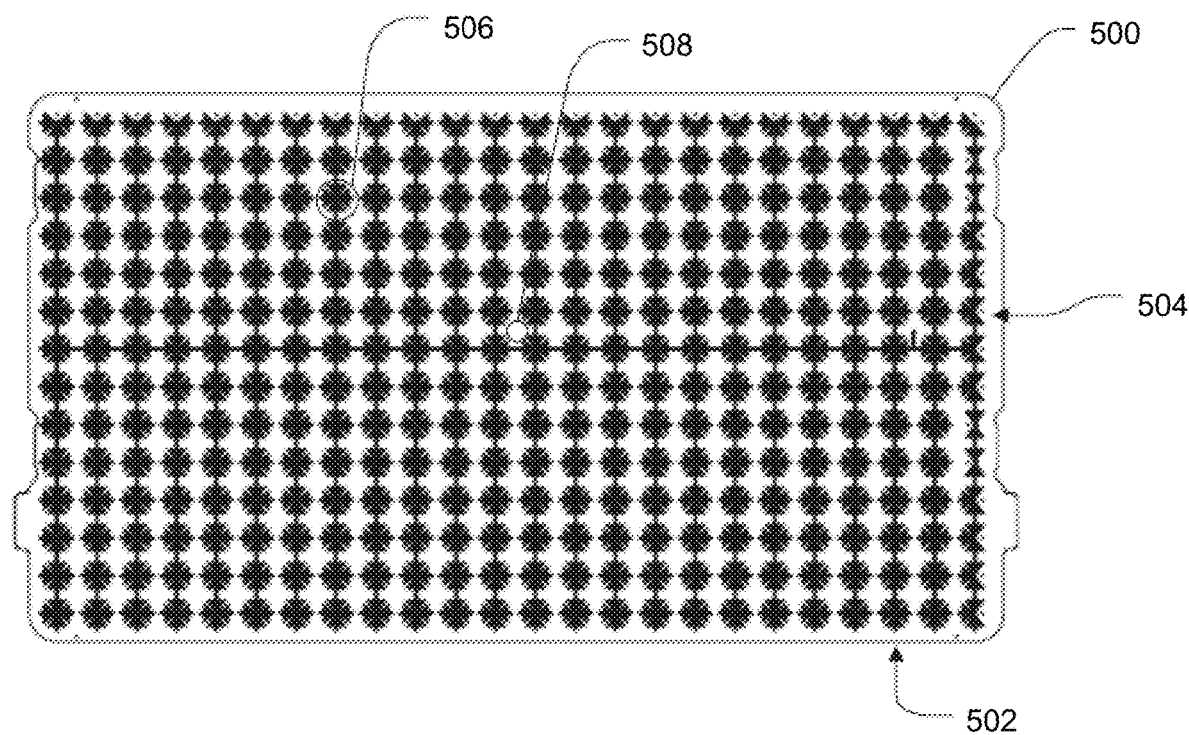
FIG. 5 depicts an example of a touchpad shield in accordance with the disclosure.

FIG. 5 depicts an example of a shield layer 500 of a touch pad stack. The shield may be used for a Wi-Fi antenna, a Near Field Communicate Antenna (NFC), another type of antenna, or combinations thereof. The shield layer 500 of FIG. 5 may be constructed to replace a typical solid or hatched shield. The shield layer 500 may have a shape constructed to shield the electrode junction areas of the touch sensor while not shielding the areas far from the junctions. The anti-node may be the area between the electrodes that is farthest away from the electrode junctions. In some cases, the shield layer 500 is constructed to block antenna signals from reaching the electrode junctions while allowing the antenna signal to pass through the anti-node areas of the touch sensor. In the illustrated example of FIG. 5, a number of vertical rows 502 of shield material and horizontal rows 504 may be fashioned to lay under the corresponding electrode. The shield material may include copper, aluminum, or other appropriate shielding material and may be etched, printed, or otherwise deposited on a substrate. As shown, the shield layer 500 specifically shields the mutual capacitance junctions (e.g., junction 506) where the electrodes overlap, but leaves the center (e.g., center 508) of each sensor cell open to allow radio frequencies to pass through. Additionally, the patterned shielding is divided into individual cells that shield individual sensor junctions. In some embodiments, the shielding cells may be connected to reduce and/or minimize the induced current from an NFC antenna or the like and reduce the power of the NFC system. In some cases, the cells may be connected radially, vertically, connected in other arrangements to reduce the induced currents. The particular shapes and rectangular grid shown for shield layer in FIG. 5 are merely exemplary and other shapes and patterns may be used.

Figure 6:
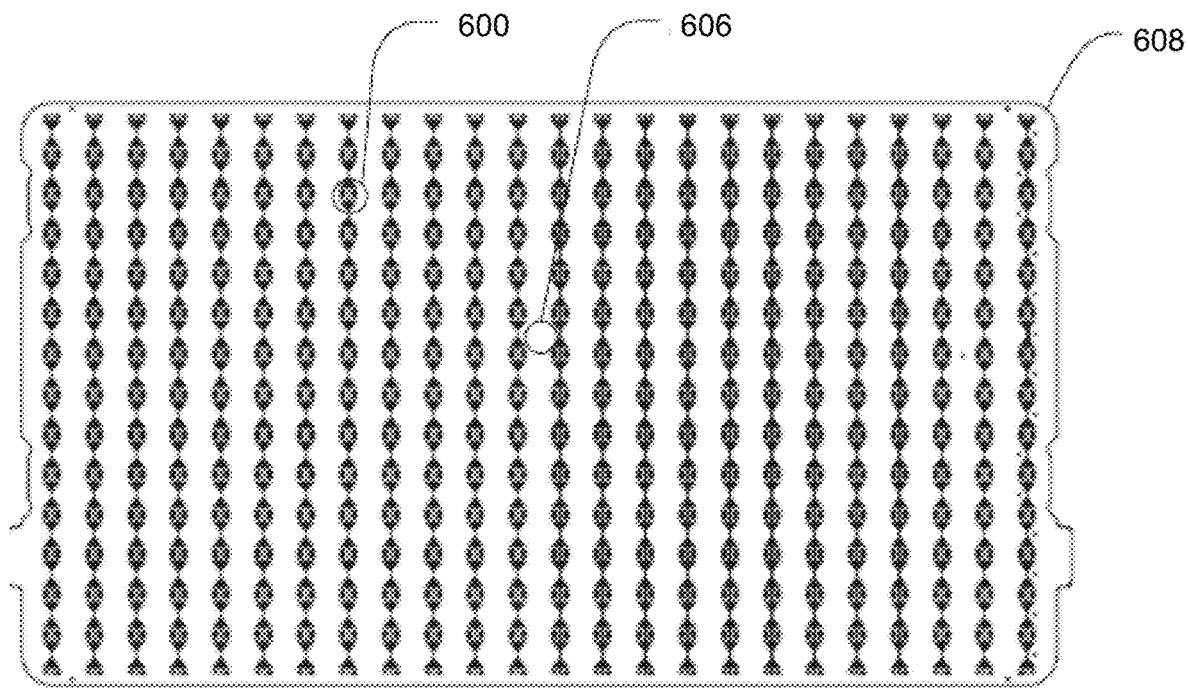
FIG. 6 depicts an example of a touchpad shield in accordance with the disclosure.
Figure 7:
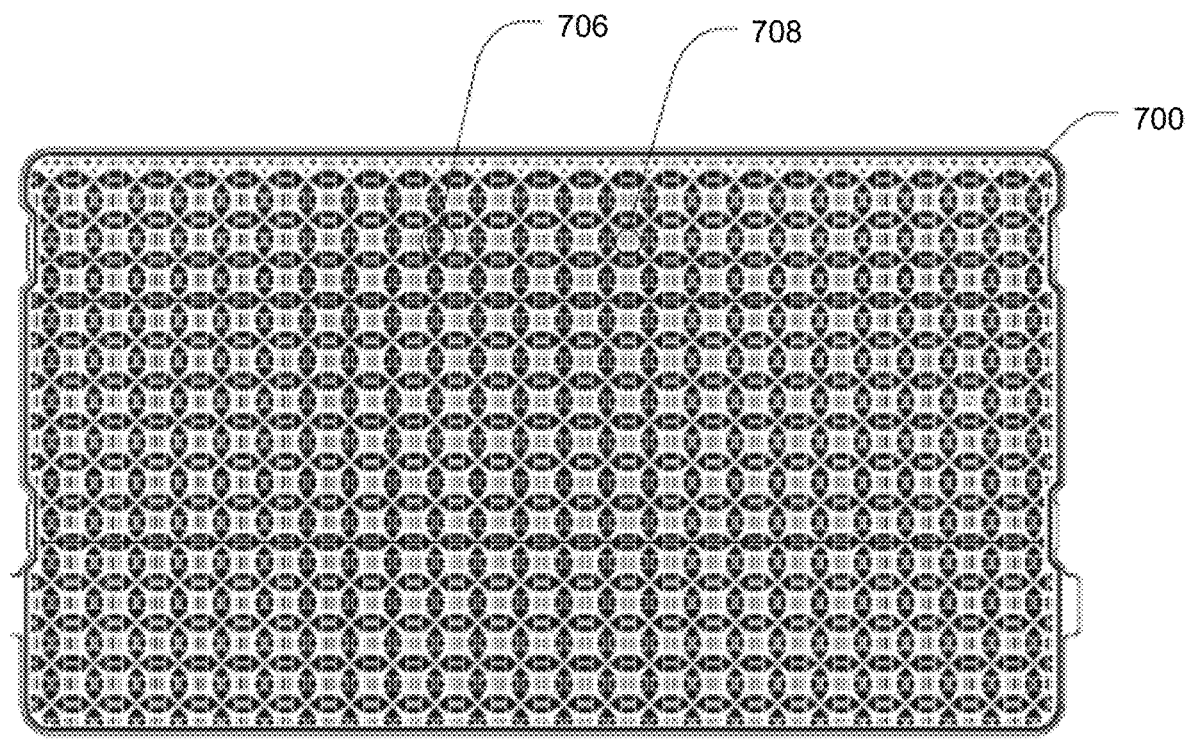
FIG. 7 depicts an example of a touchpad shield in accordance with the disclosure.

For example, FIGS. 6-7 show other exemplary shapes and patterns that may be used in accordance with disclosed embodiments. FIG. 6 shows an embodiment of a shield layer 600 that has relatively smaller junctions 606 and relatively larger open centers 608 and FIG. 7 shows an embodiment of a shield layer 700 that has relatively denser junctions 706 and relatively smaller open centers 708. As a person of ordinary skill in the art having the benefit of this disclosure would understand, other shapes, patterns, junctions, open centers, and the like may be employed depending upon the functions and frequencies involved in a particular processor-based device, touchpad, transceiver, and the like.

Figure 8:
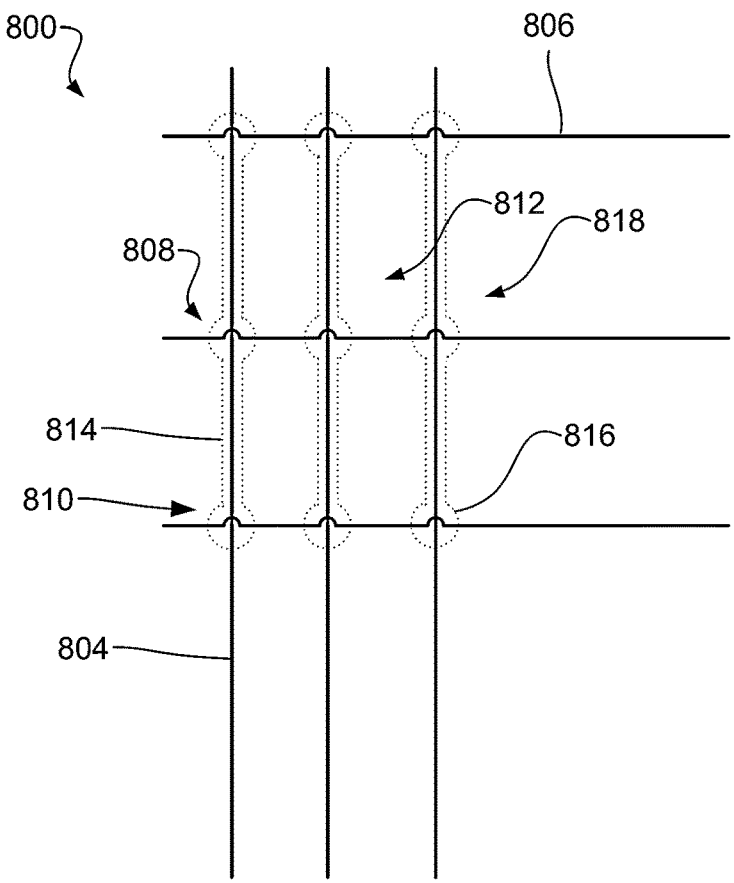
FIG. 8 depicts an example of a shield structure in accordance with the disclosure.

FIG. 8 depicts an example of a grid 800 of electrodes of the touch sensor. In this example, multiple transmit electrodes 804 are disposed on a substrate and orthogonally arranged with sense electrodes 806 also disposed on the substrate. The transmit electrodes 804 and the sense electrodes 806 overlap with each other, but are electrically isolated from each other, forming mutual capacitance intersections 808. In some cases, the electrical insulation is provided through the substrate, with the transmit electrodes 804 being disposed on a first side of the substrate and the sense electrodes 806 being disposed on a second side of the substrate. In some cases, as the voltage changes on a first transmit electrode, the capacitance on each sense electrode crossed by the first transmit electrode changes at the intersection where the electrodes cross. Further, when an electrically conductive object approaches the touch sensor, the mutual capacitance intersections near the object touching or approaching the touch sensor have changes in their capacitance at these intersections.

In some examples, the surface of the touch sensor that is configured to receive touch or proximity signals from a user is on a front, interfacing surface. The surface of the touch sensor that includes the shield near or on the opposite side or back side of the touch sensor. The shield structure may be disposed between the back surface of the touch sensor and the antenna.

In the example of FIG. 8, the shield structure includes an electrically conductive material 810 that defines openings 812. The wireless signals transmitted by the antenna can pass through the openings 812 defined in the electrically conductive material 810. However, the portions of the electrically conductive material 810 that remain may overlap with the transmit electrodes 804, the sense electrodes 806, the mutual capacitance intersections 808 between the transmit and sense electrodes, other portions of the touch sensor, or combinations thereof. In the illustrated example, the electrically conductive material 810 includes narrow cross sectional width 814 that is aligned with the transmit electrodes 804. At those regions of the shield structure that overlap with the mutual capacitance intersections 808, the electrically conductive material 810 includes in width and area forming a patterned shielding area 816 to provide more efficient shielding at the mutual capacitance intersections. In this example, the patterned shielding areas 816 are electrically connected in a vertical column 818 by the narrow cross sectional widths 814.

Figure 9:
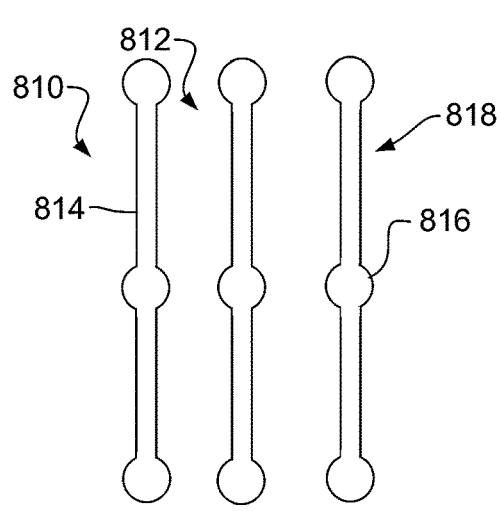
FIG. 9 depicts an example of a shield structure in accordance with the disclosure.

FIG. 9 depicts an example of an electrically conductive material 810 with narrow cross sectional widths 814 and patterned shielding areas 816 overlapping at the mutually capacitive intersections. The openings 812 are defined by the space between the vertical columns 818. In this specific example, portions of the sensor electrodes are not shielded by a portion of the electrically conductive material 810.

Figure 10:
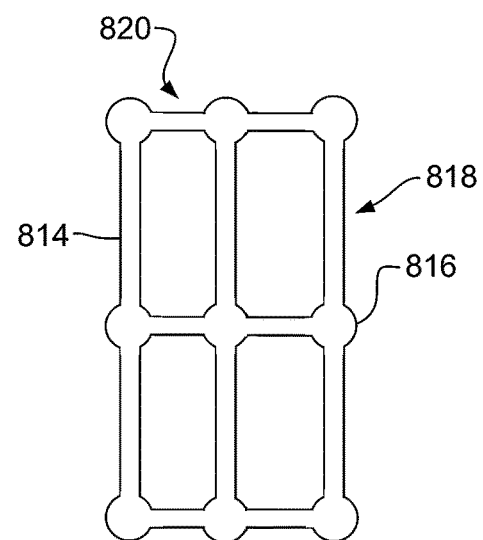
FIG. 10 depicts an example of a shield structure in accordance with the disclosure.

In the example of FIG. 10, the patterned shielding areas 816 are radially connected with additional narrow cross sectional widths 814 that overlap the sense electrodes forming a horizontal row 820. In this example, the openings are located between the vertical columns 818 and the horizontal rows 820. In some examples, radially connecting the vertical columns may minimize the induced current and/or reduce the needed power to transmit a wireless signal for some types of antennas.

Figure 11:
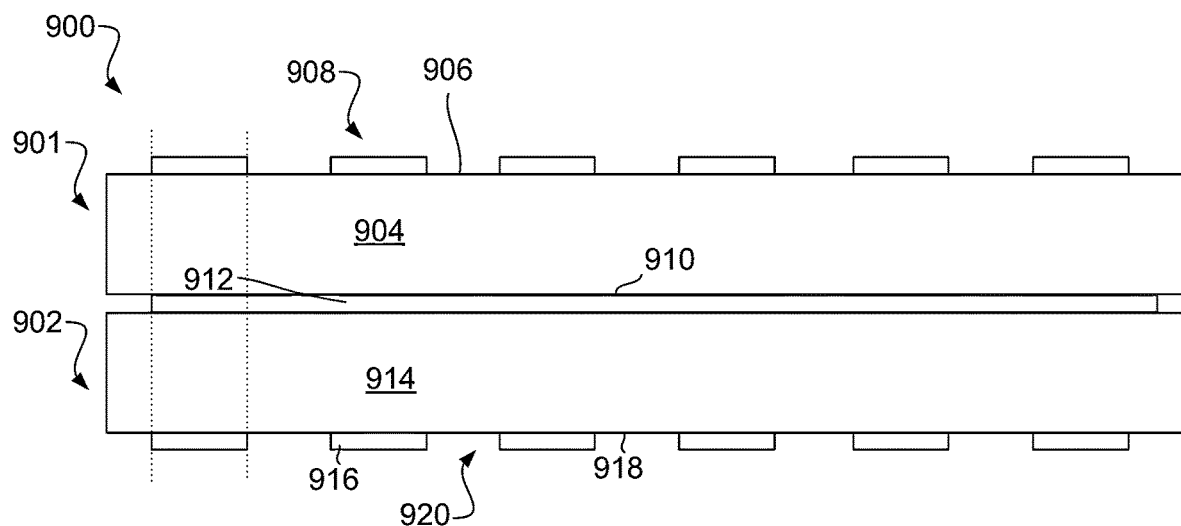
FIG. 11 depicts an example of a shield structure in accordance with the disclosure.

FIG. 11 depicts a cross sectional view of a stack 900 with a touch sensor 901 and a shield structure 902. The touch sensor 901 may include a substrate 904. The substrate 904 may be any appropriate type of substrate, such as a printed circuit board, fiberglass, an electrically insulating material, another type of material, or combinations thereof. On a first side 906 of the substrate 904, a first set 908 of electrodes may be deposited. The first set 908 of electrodes may be transmit electrodes, sense electrodes, or another type of electrodes. On a second side 910 of the substrate 904 opposite of the first side 906, a second set 912 of electrodes may be deposited. The second set 912 of electrodes may be transmit electrodes, sense electrodes, or another type of electrodes. In this example, the first set 908 and the second set 912 of electrodes are orthogonal to each other.

Adjacent to the second set 912 of electrodes may be an electrically insulating material 914, and an electrically conductive material 916 may be deposited on the far side 918 of the electrically insulating material 914, opposite the second set 912 of electrodes.

The electrically conductive material 916 may shield certain portions of the touch sensor 901 from the radio frequencies emitted from an antenna. However, the electrically conductive material 916 may include openings 920 that all the radio frequencies to pass through the shielding material.

Figure 12:
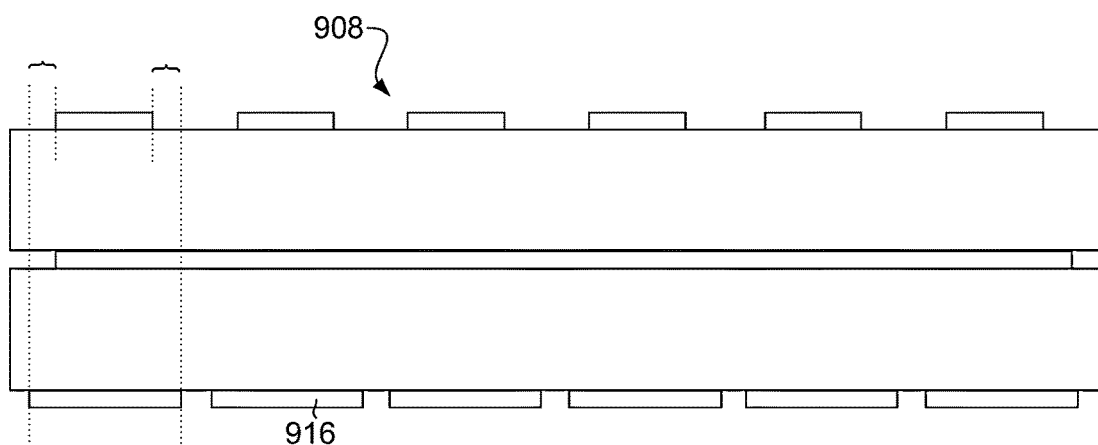
FIG. 12 depicts an example of a shield structure in accordance with the disclosure.

In the example of FIG. 11, the width of the electrically conductive material 916 overlapping with the mutual capacitance intersections is as wide as the electrodes in the first set 908. However, in the example of FIG. 12, the width of the electrically conductive material 916 is wider than the width of the electrodes of the first set 908 of electrodes or wider than the mutual capacitance intersection. The width of the electrically conductive material may depend on the tuning and/or other electrically characteristics of the antenna. However, width of the electrically conductive material 916 may also vary throughout the touch sensor based on the proximity to the antenna.

In some examples, it may be desirable to have larger openings in the electrically conductive material in those regions that are closer to the antenna. In such regions, the electrically conductive material 916 may cover less surface area allowing the openings to be larger thereby providing a larger amount of space for the radio frequencies to pass through. In those regions of the touch sensor that are located farther away from the antenna, the openings may be smaller with the electrically conductive material 916 covering a greater amount of the touch sensor's surface area.

Figure 13:
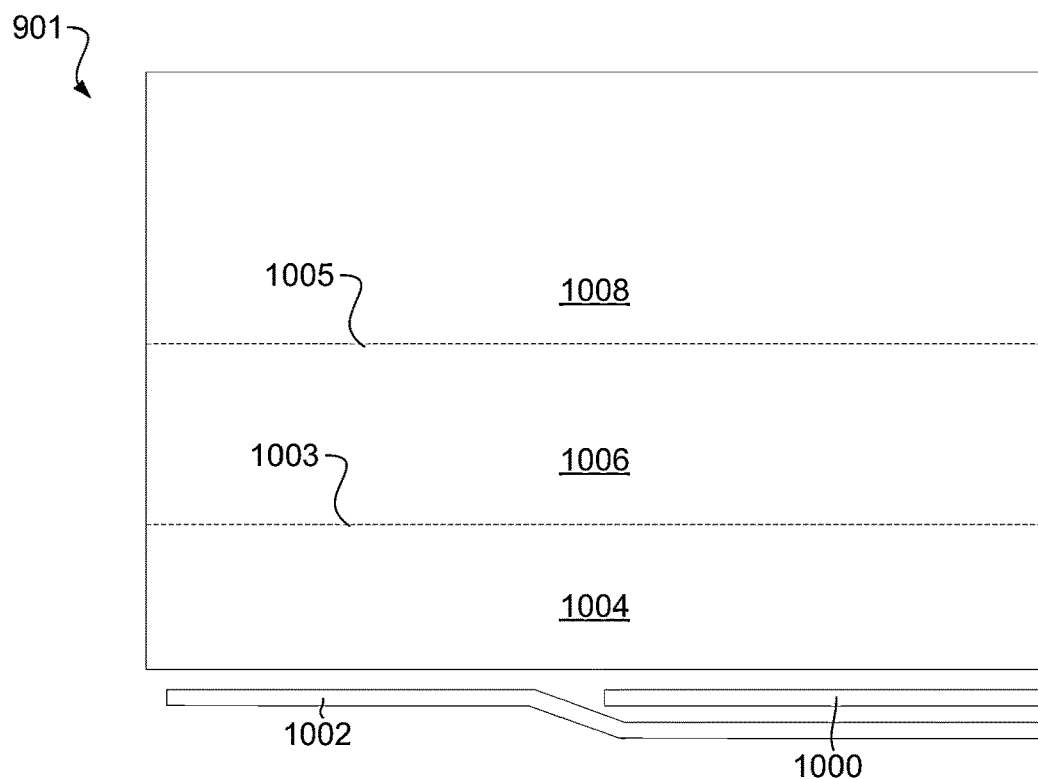
FIG. 13 depicts an example of a shield structure in accordance with the disclosure.

FIG. 13 depicts an example of touch sensor 901, a first antenna 1000, and a second antenna 1002. In this example, the touch sensor 901 has a first region 1004, second region 1006, and a third region 1008. The dashed lines 1003 and 1005 may generally represent boundary changes between the regions. The first region 1004 may be the closest to the antenna 1000, 1002, the second region 1006 may be the next closest to the antennas 1000, 1002, and the third region 1008 may be located the farthest away from the antennas 1000, 1002. In this example, the openings in the shielding material of the first region 1004 may be larger than in the other regions thus the shielding material may cover less overall surface area in the first region 1004. In the second region 1006, the shielding material may cover an increased amount of surface area making the openings smaller. In the third region 1008, the openings may be the smallest allowing the shielding material to cover even more surface area than in the second region 1006. In some cases, the shield material in the third region 1008 may cover all the surface area without providing openings.

Figure 14:
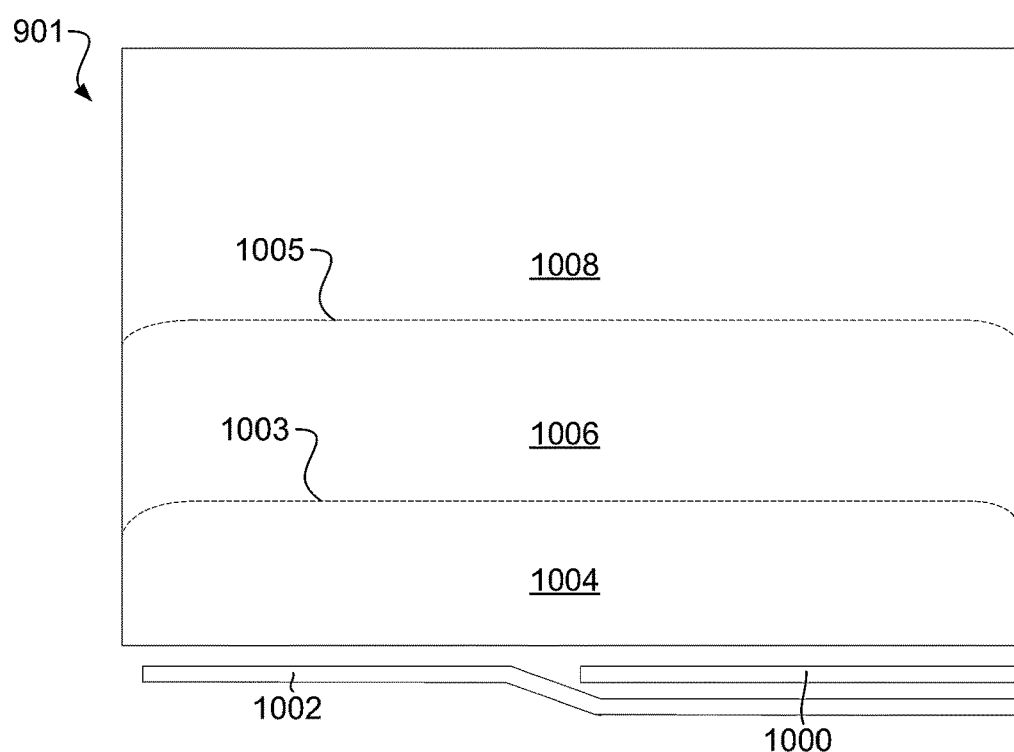
FIG. 14 depicts an example of a shield structure in accordance with the disclosure.

FIG. 14 depicts an example of the boundary changes curving at the edges of the touch sensor 901. In this example, the boundary changes may reside at a predetermined distance from a surface of the antenna or an active portion of the antenna. In this example, the ends of the antennas do not reach the end of the touch sensor 901, thereby allowing the second and third regions 1006, 1008 of the touch sensor 901 to have greater areas.

Figure 15:
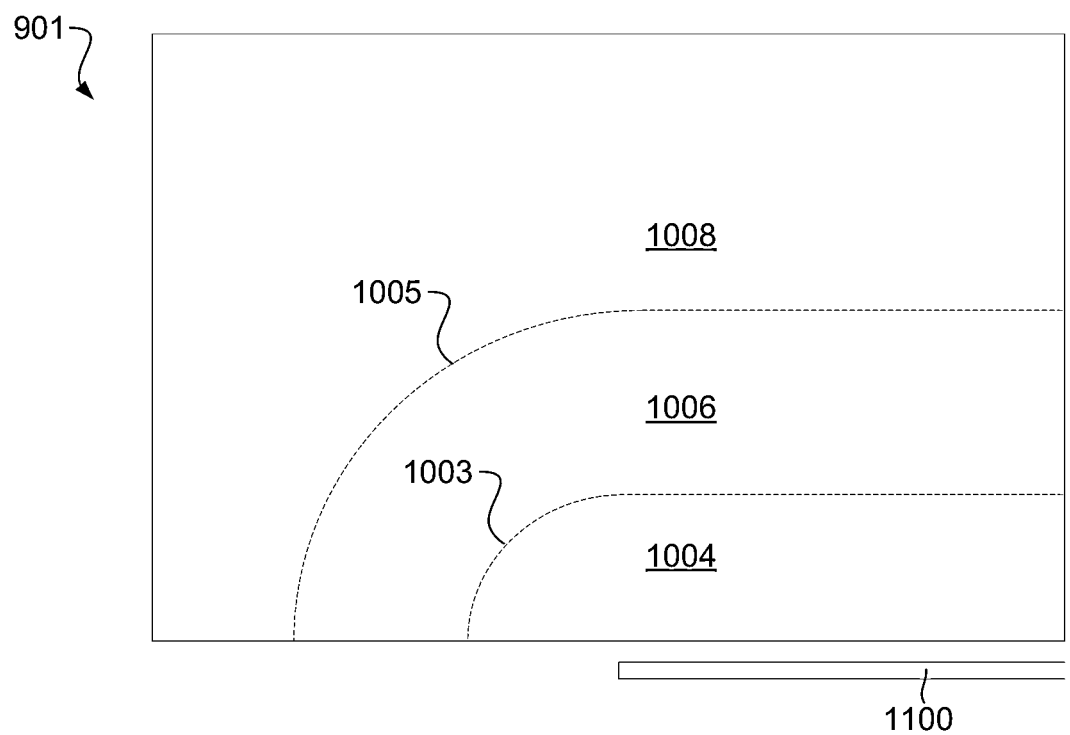
FIG. 15 depicts an example of a shield structure in accordance with the disclosure.

In the example of FIG. 15, just a single antenna 1100 is depicted adjacent to the touch sensor 901. In this example, the antenna 1100 resides along just a portion of the length of the touch sensor 901. In this example, the boundaries to the first region 1004 may decrease while the regions of the second region 1006 and third region 1008 may increase.

Figure 16:
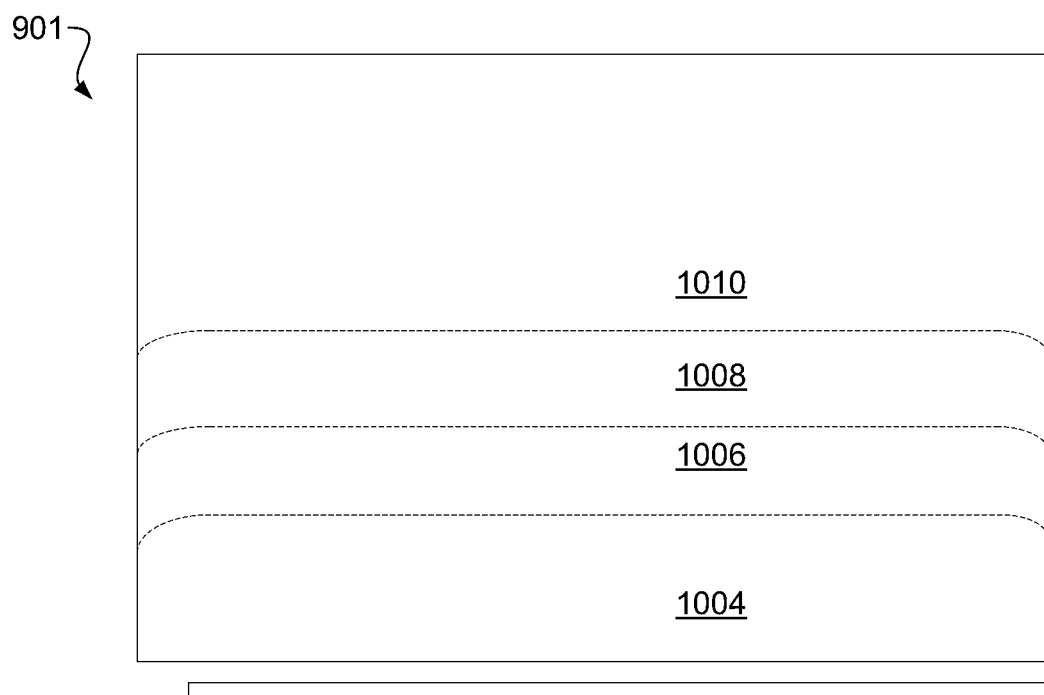
FIG. 16 depicts an example of a shield structure in accordance with the disclosure.

The touch sensor 901 may include any appropriate number of regions with different amounts of shield material. For example, FIG. 16 depicts that the touch sensor 901 may include more than four regions 1004, 1006, 1008, 1010, but more regions are included in other embodiments. In some examples, just two regions may exist that have different amounts of shielding.

Figure 17:
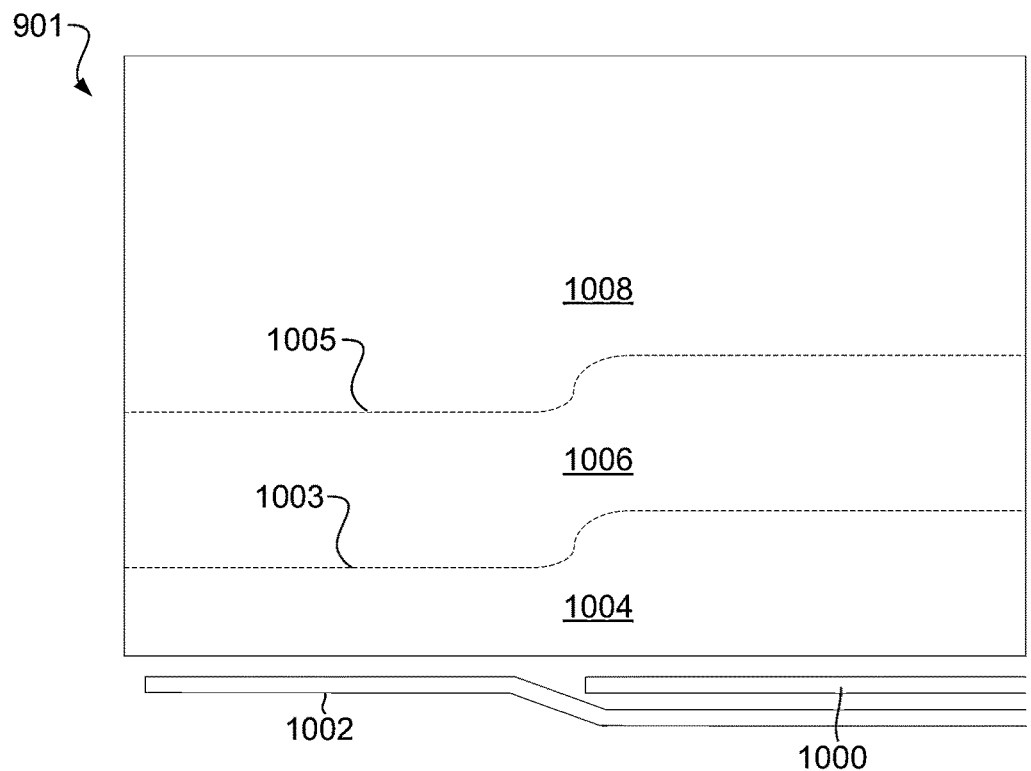
FIG. 17 depicts an example of a shield structure in accordance with the disclosure.

Further, the geometries of those regions with varying amounts of shielding may have different amounts of surface area. In the example of FIG. 17, the boundaries 1003, 1005 between the regions are irregular. In this example, the boundaries 1003, 1005 may be shaped to accommodate the different characteristics of each antenna. For example, it may be desirable for the first region 1004 to have more area based on the electrical characteristics of the first antenna 1000, while it may be more desirable for the first region 1004 to have less area due to the second antenna's electrical characteristics. Thus, the geometry of the different regions may include having less area on one side of the touch sensor 901 than on the other side.

Figure 18:
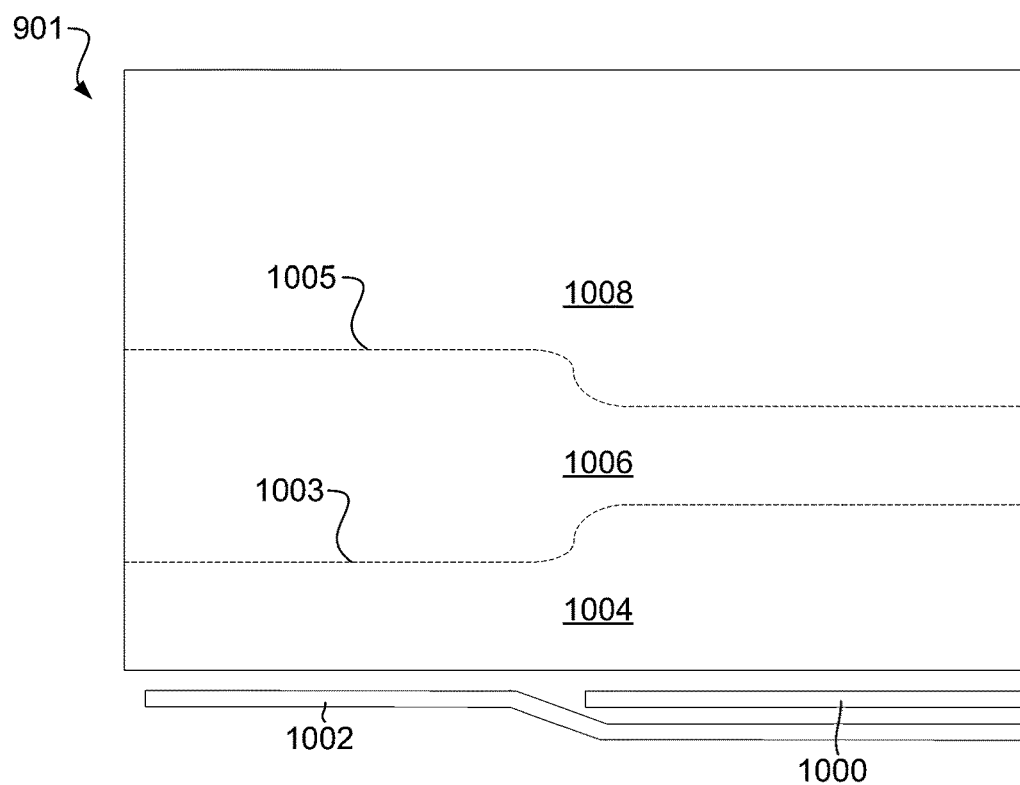
FIG. 18 depicts an example of a shield structure in accordance with the disclosure.

FIG. 18 depicts an example, where the amount of shielding based on the electrical characteristics of the first antenna 1000 includes a larger area with less shielding, but transitions more quickly to the second region 1006 with more shielding. On the other hand, the electrical characteristics of the second antenna 1002 may make it desirable to have a smaller area with less shielding proximate to the second antenna and a longer transition area to the regions with no openings in the shielding. While these examples have depicted touch sensors having specific configurations with varying amounts of shielding, any arrangements of different sizes and geometries of regions with varying amounts of shielding may be used in accordance with the principles described herein.

Figure 19:
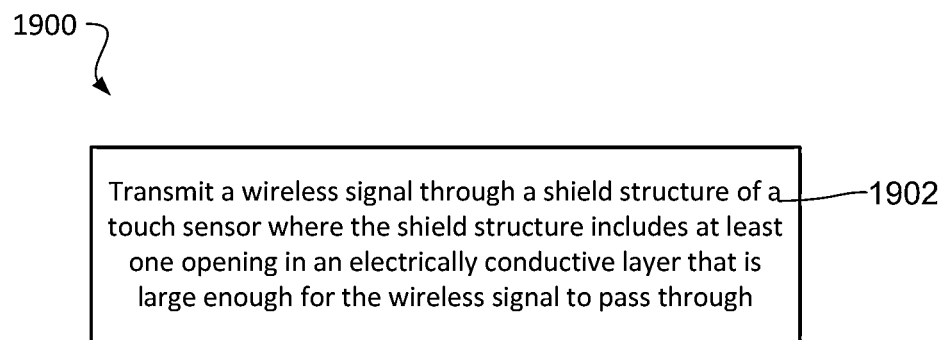
FIG. 19 depicts an example of a method for transmitting a wireless signal in accordance with the disclosure.

FIG. 19 depicts an example of a method 1900 of transmitting a signal. This method 1900 may be performed based on the description of the devices, module, and principles described in relation to FIGS. 1-18 and 20-32. In this example, the method 1900 includes transmitting 1902 a wireless signal through a shield structure of a touch sensor where the shield structure includes at least one opening in an electrically conductive material that is large enough for the wireless signal to pass through.

Figure 20:
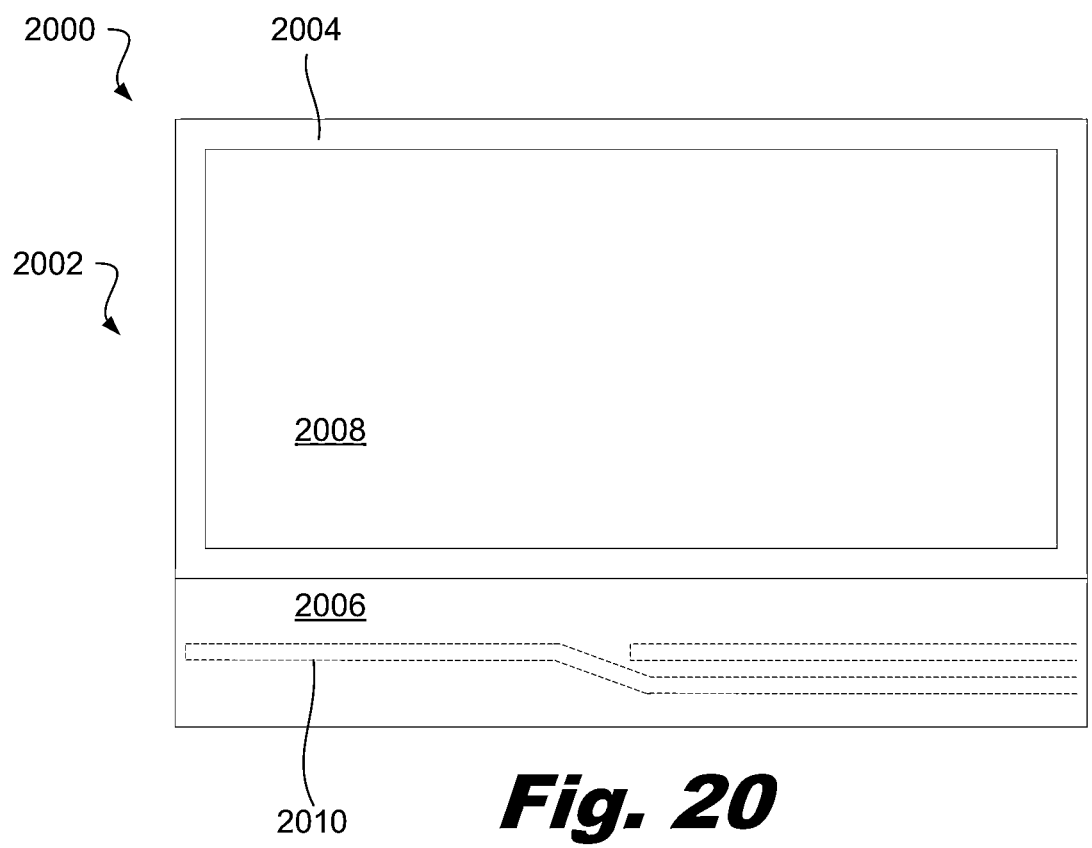
FIG. 20 depicts an example of a touch sensor in accordance with the disclosure.

FIG. 20 depicts an example of a touch sensor 2000. In this example, a first layer 2002 of the touch sensor 2000 is depicted. A first set of electrodes are formed on a first layer 2002, but for purposes of illustration, the first set of electrodes are not shown.

A ground feature 2004 is also formed on the first layer 2002. The ground feature 2004 may be electrically connected to ground. For example, the ground feature 2004 may be in electrical connection with other layers of the touch pad stack. In some examples, one of the other layers of the touch pad stack may include an electrical connection to a ground source, such as a frame of a laptop, frame of a display device, frame of a phone, frame of another type of computing device, frame of a car or another type of vehicle, another type of frame, another type of ground source, or combinations thereof.

Figure 21:
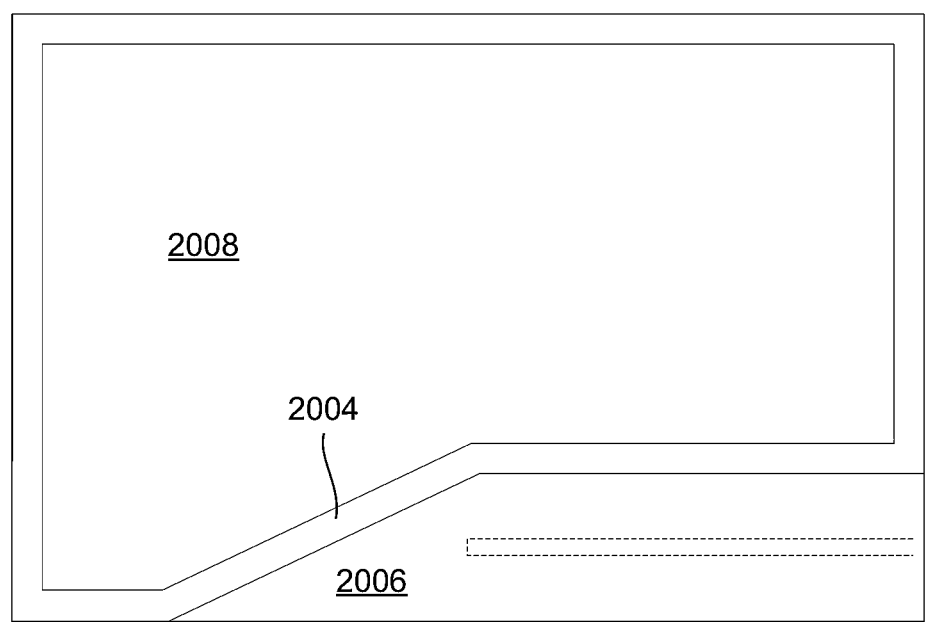
FIG. 21 depicts an example of a touch sensor in accordance with the disclosure.

In this example, the ground feature 2004 is a ring. A first region 2006 of the first layer 2002 is surrounded by the ground feature 2004. A second region 2008 of the first layer is positioned outside of the ring. In such an example, the ground feature 2004 divides the first region 2006 from the second region 2008. The division between the first region 2006 and the second region 2008 is a straight line. However, in the example depicted in FIG. 21, the ground feature 2004 does not spilt the first and second regions 2006, 2008 with a straight line. In the example of FIG. 21, the ground feature 2004 divides the regions 2006, 2008 with a bent line. However, the ground feature 2004 may divide the first region 2006 from the second region 2008 in any suitable manner. For example, a non-exhaustive list of ways that the ground feature 2004 may divide the first and second regions 2004, 2006 includes with a straight line, a bent line, a line with multiple bends, a curved line, a symmetric line, an asymmetric line, a wavy line, a segmented line, a line with different widths, another type of line, or combinations thereof.

The first region 2006 of the first layer 2002 may correspond to and align with a first section of the shield layer that has a first electrical characteristic, and the second region 2008 of the first layer 2002 may correspond to and align with a second section of the shield layer that has a different electrical characteristic than the first electrical characteristic. In some examples, the first section of the shield layer may have an electrical characteristic that aids in allowing the transmission of radio frequency signals through the shield layer, while the second section of the shield layer has the electrical characteristic of blocking the radio frequency signals. In such an example, the transmission of radio frequency signals through the first section of the shield layer may be achieved by defining openings through the thickness of the first section. In such an example, an antenna 2010 may be disposed under the first section of the shield layer and therefore under the first region 2006 of the first layer 2002. The second section of the shield layer may block radio frequency transmissions by being a continuous, solid section.

However, due to the differences in electrical properties of the first section of the shield layer and the electrical properties in the second section of the shield layer, the capacitance measurements may read differently in the finger contacts made in the first region 2006 of the first layer 2002 and the same types of finger contacts made in the second region 2008 of the first layer 2002. In other words, due to the differences in electrical properties of the shield layer sections, the different regions 2006, 2008 of the first layer 2002 may provide different capacitance responses. Such a non-uniform response may require additional processing, additional programmed instructions stored in computer memory, and other tuning that would not otherwise be involved but if not for the differences in the electrical properties of the shield layer. The incorporation of a ground feature that separates the first region 2006 from the second region 2008 of the first layer 2002 has been found to eliminate or reduce the inconsistency of the capacitance readings between the first region 2006 and the second region 2008 of the first layer 2002.

Figure 22:
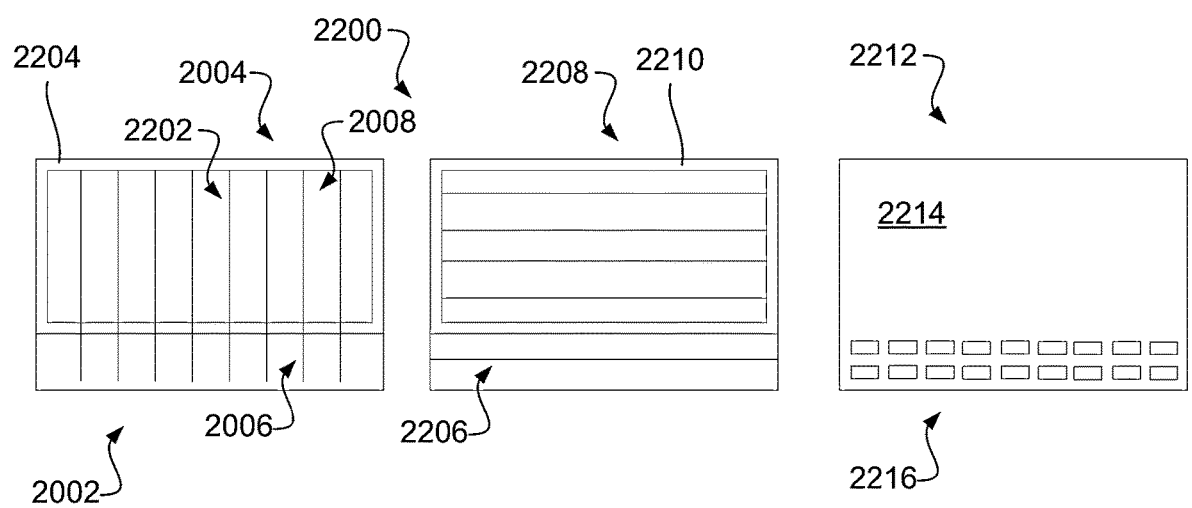
FIG. 22 depicts an example of layers of a touch sensor stack in accordance with the disclosure.

FIG. 22 depicts an example of the touch pad stack 2200. In this example, a first set of electrodes 2202 and a first portion 2204 of the ground feature 2004 is formed on the first layer 2002. A second set 2206 of electrodes is formed on the second layer 2208 and a second portion 2210 of the ground feature 2004 is also formed on the second layer 2208. The shield layer 2212 has a first section 2214 that matches the first region 2006 of the first layer 2002 and a second section 2216 that matches the second region 2008 of the first layer 2002.

The first section 2214 of the shield layer 2212 is solid and has the electrical characteristic of blocking all radio frequency transmissions. The second section 2216 of the shield layer 2212 has a number of openings defined through its thickness and has the electrical characteristic of allowing at least some radio frequency transmission to pass through the shield layer 2212. The regions 2006, 2008 in the first layer 2002 corresponding to the first and second sections 2214, 2216 of the shield layer 2212 are divided by the ground feature 2004. Further, the second portion 2210 of the ground feature 2004 on the second layer 2208 likewise divides the corresponding regions on the second layer 2208.

The first portion 2204 and the second portion 2210 of the ground feature on the first and second layers 2002, 2208 of the touch pad stack 2200 respectively, may be in electrical communication with each other. This may be accomplished by forming vias in a dielectric material that separates the first layer 2002 from the second layer 2208 and electrically connecting the first portion 2204 to the second portion 2210 through the vias.

Figure 23:
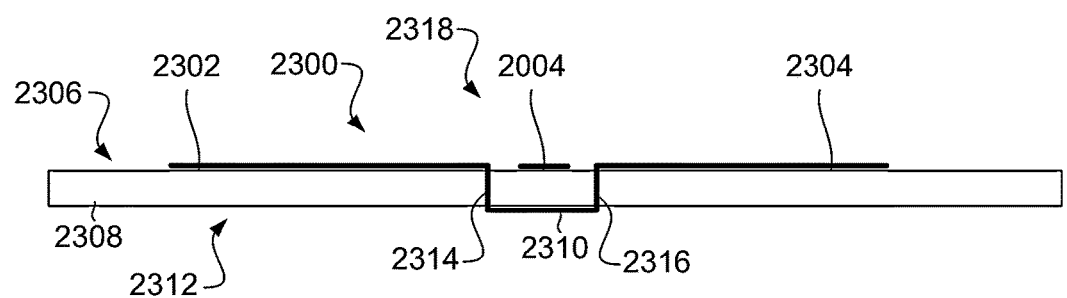
FIG. 23 depicts an example of a touch sensor in accordance with the disclosure.

FIG. 23 depicts an electrode 2300 on the first layer or the second layer along with a respective portion of the ground feature 2004 formed on the same layer. In this example, the electrode and the respective portion of the ground feature are electrically isolated from each other. The electrode 2300 may be rerouted around the ground feature 2004. In this example, a first segment 2302 and a second segment 2304 of the electrode 2300 are deposited on a first side 2306 of a substrate 2308, and a third segment 2310 of the electrode 2300 is deposited on a second side 2312 of the substrate 2308. The first segment 2302 is connected to the third segment 2310 with a first via 2314 and the third segment 2310 and the second segment 2304 are connected with a second via 2316. The ground feature 2004 is located in the gap 2318 formed between the first segment 2302 and the second segment 2304 on the first side 2306 of the substrate 2308. While this example depicts one way to reroute an electrode around a ground feature, other ways of rerouting the electrode are foreseen. For example, the different portions of the electrode may be formed on different sides of the same substrate, on different substrates of different layers of the touch pad stack, on other different locations of the touch pad stack, or combinations thereof.

Figure 24:
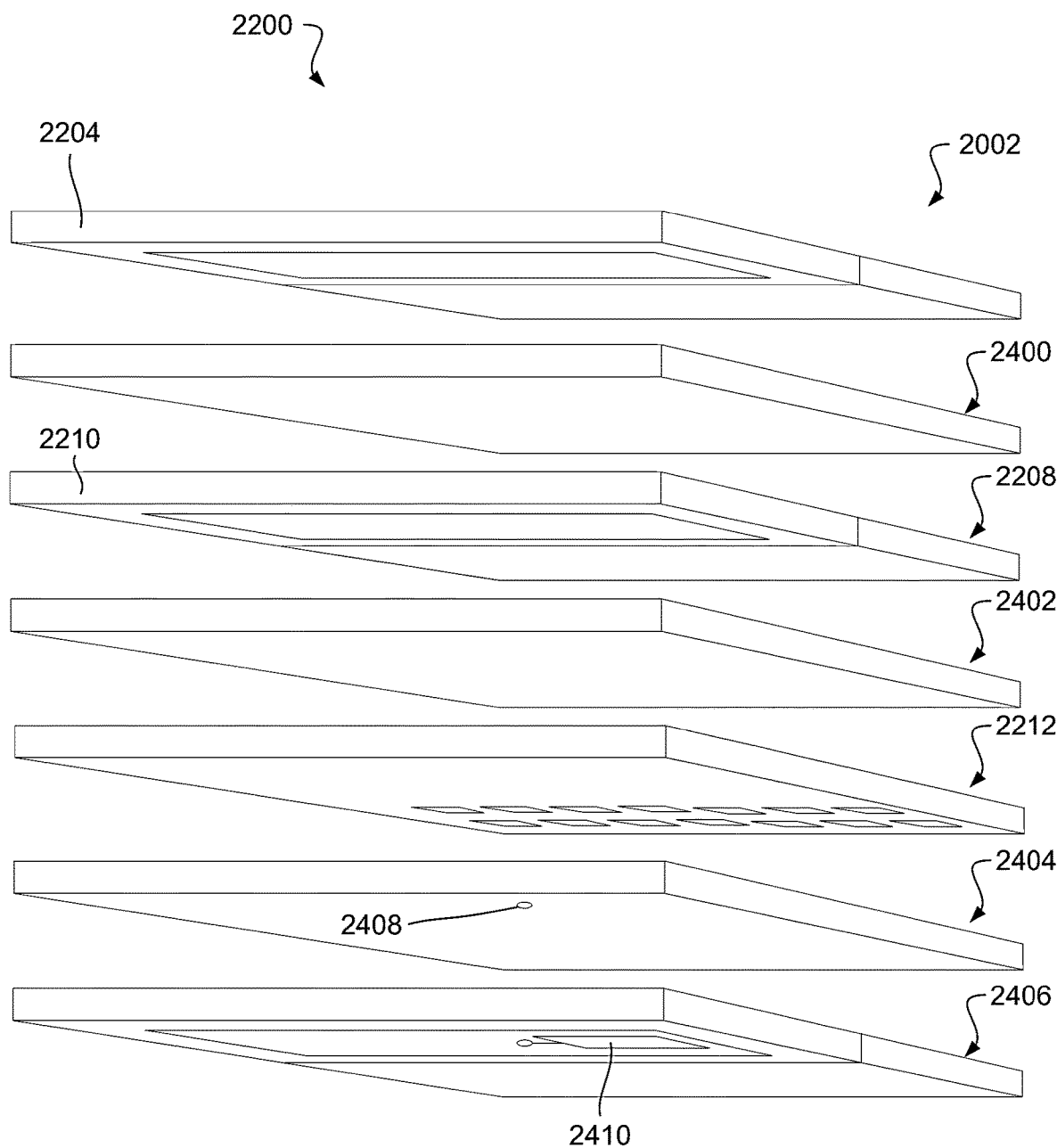
FIG. 24 depicts an example of layers of a touch sensor stack in accordance with the disclosure.

FIG. 24 depicts an example of a touch pad stack 2200. In this example, the touch pad stack 2200 includes the following layers in a top down sequence: first layer 2002, a first dielectric 2400, a second layer 2208, a second dielectric 2402, a shield layer 2212, a third dielectric 2404, and a component layer 2406.

The dielectric layers 2400, 2402, 2404 may be used to prevent the electrically conductive portions of the other layers 2002, 2208, 2212, 2406 from shorting to each other. As described above, the first portion 2204 of the ground feature 2004 of the first layer 2002 may be connected to the second portion 2210 of the ground feature 2004 on the second layer 2208 through one or more vias. While not shown for illustrative purposes, multiple vias may be formed in the first dielectric 2400 to connect the portions 2204, 2210 of the ground feature 2004.

In some cases, the shield layer 2212 is not directly connected electrically to the ground feature 2004. However, a comparatively high resistance connection 2408 between the shield layer 2212 and the component layer 2406 may be formed through the third dielectric 2404. A ground connection pad 2410 may be formed on the component layer 2406, which is configured to connect to a ground source of the appropriate computing device that the touch pad stack is configured to be inserted into. The ground feature may also be electrically connected to the component layer by forming vias in the dielectric layers. The electrical connections from the ground feature 2004 to the component layer 2406 may have relatively less electrical resistance than the connection 2408 between the shield layer 2212 and the component layer 2406. Such an arrangement may prevent current from the ground feature from reaching the shield layer 2212. Instead, the electrical charge from the ground feature 2004 may be directed to the ground source through the ground connection pad 2410 on the component layer 2406.

Figure 25:
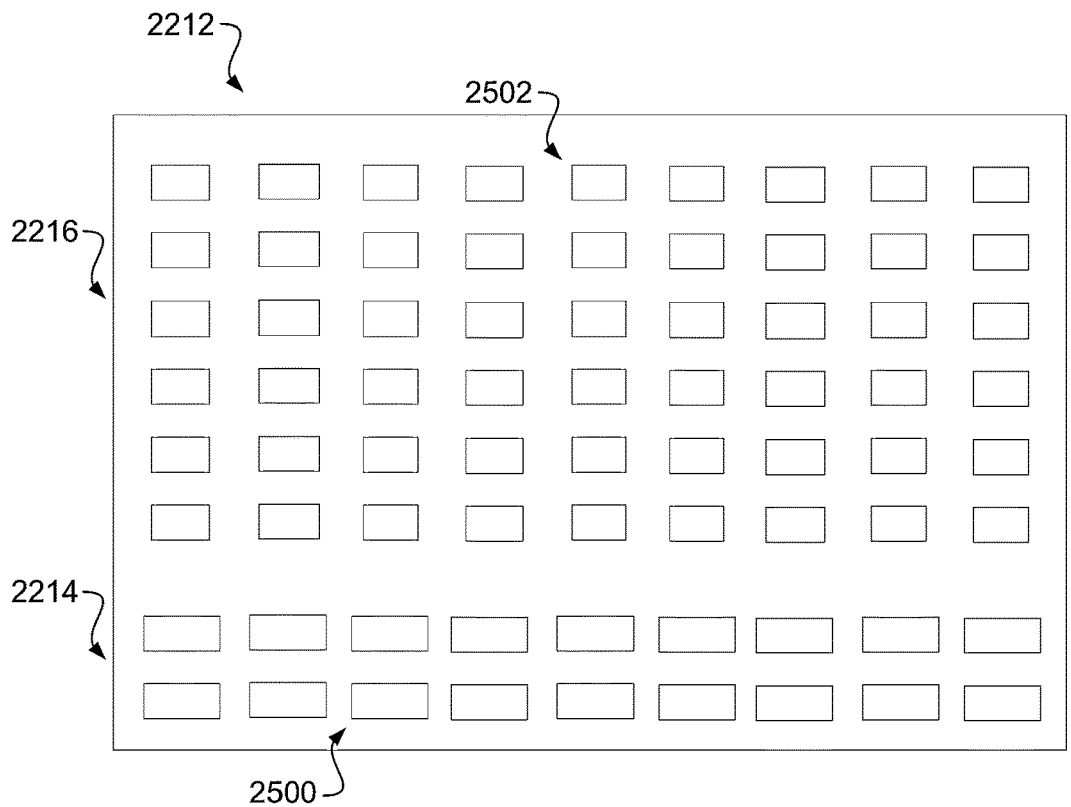
FIG. 25 depicts an example of a shield layer in accordance with the disclosure.

FIG. 25 depicts an example of a shield layer 2212. In this example, the first section 2214 of the shield layer 2212 includes a first set 2500 of openings with a first dimension (e.g., length, width, another dimension, or combinations thereof) and the second section 2216 of the shield layer 2212 includes a second set 2502 of openings with a second dimension (e.g., length, width, another dimension, or combinations thereof). The first dimension may be different than the second dimension.

Figure 26:
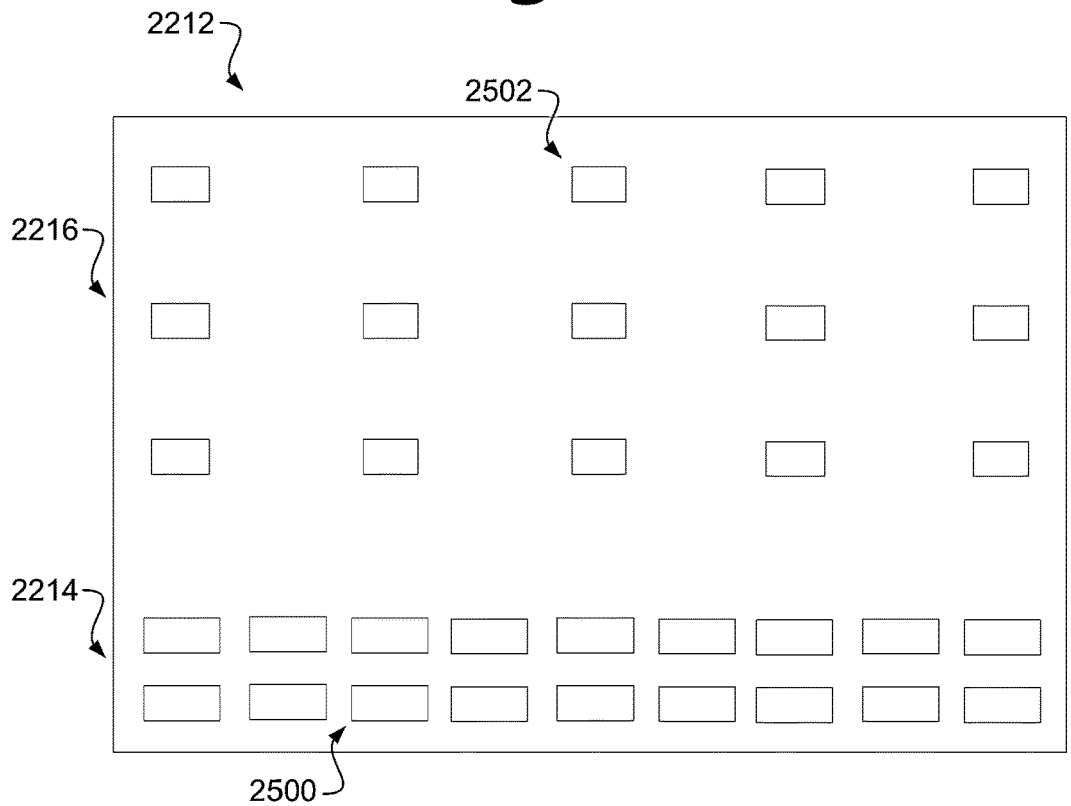
FIG. 26 depicts an example of a shield layer in accordance with the disclosure.

FIG. 26 depicts an example of a shield layer 2212. In this example, the first section 2214 of the shield layer 2212 includes a first set 2500 of openings with a spacing and the second section 2216 of the shield layer 2212 includes a second set 2502 of openings with a second spacing. The first spacing may be different than the second spacing.

Figure 27:
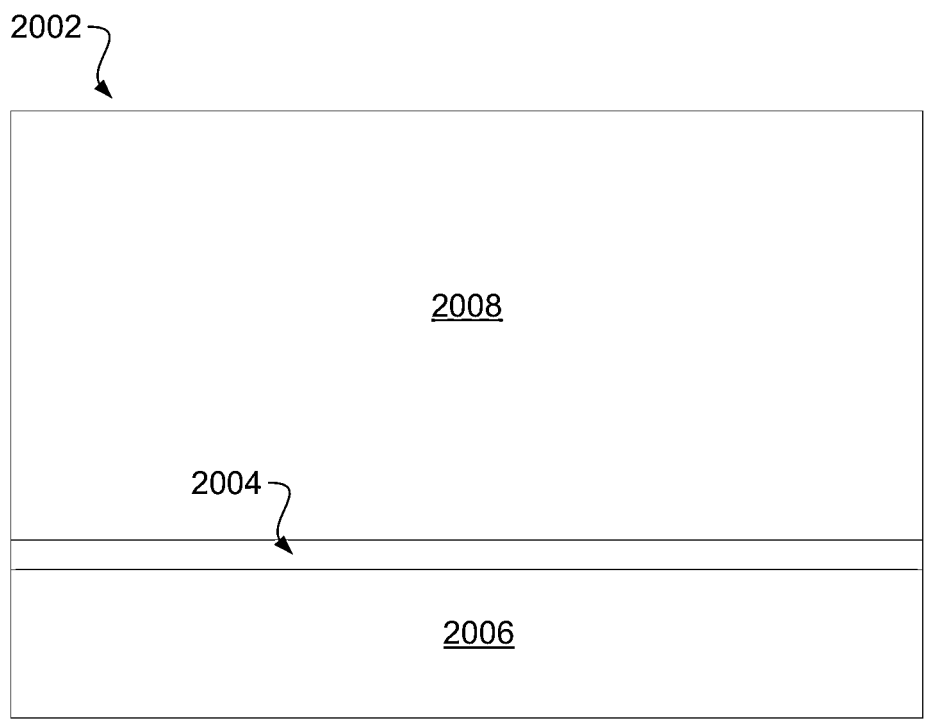
FIG. 27 depicts an example of a touch sensor in accordance with the disclosure.

FIG. 27 depicts an example of the first layer 2002. In this example, the ground feature 2004 is a single strip that divides a first region 2006 of the first layer 2002 from a second region 2008 of the first layer 2002.

Figure 28:
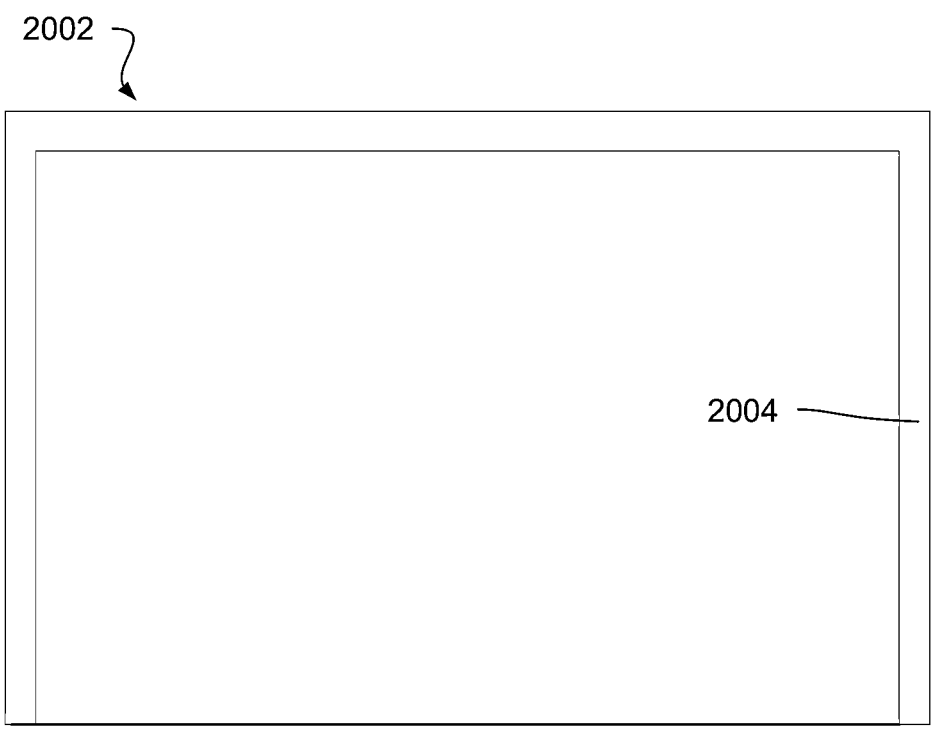
FIG. 28 depicts an example of a touch sensor in accordance with the disclosure.

FIG. 28 depicts an example of the ground feature 2004 where the ground feature 2004 has a U-shape. In this example, the ground feature 2004 partially surrounds a region of the first layer 2002. The opening in the ground feature 2004 may be aligned with a section of the shield layer 2212 that has a different electrical characteristic than the rest of the shield layer 2212.

Figure 29:
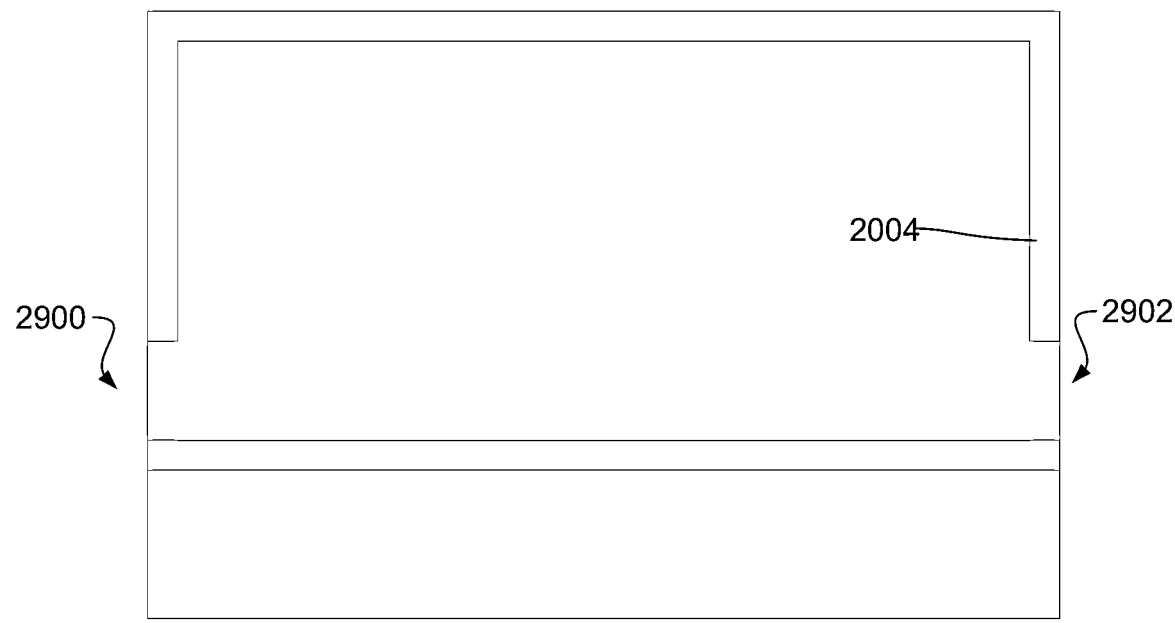
FIG. 29 depicts an example of a touch sensor in accordance with the disclosure.
Figure 30:
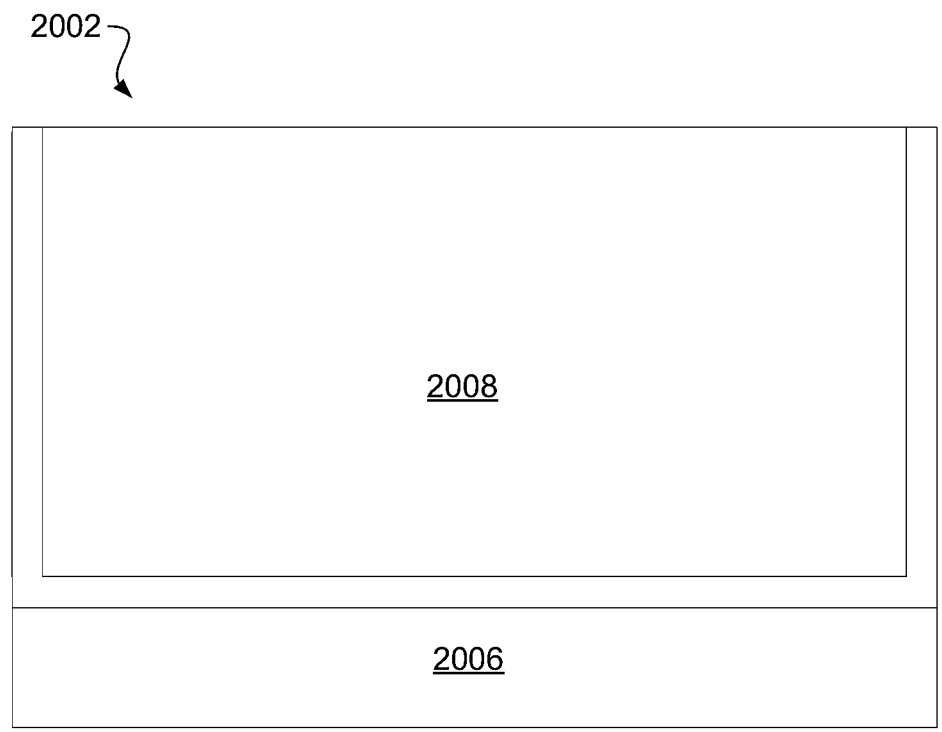
FIG. 30 depicts an example of a touch sensor in accordance with the disclosure.

FIG. 29 depicts an example of a ground feature 2004 that includes a first gap 2900 and a second gap 2902. FIG. 30 depicts an example of a ground feature 2004 that divides a first region 2006 from a second region 2008 where the ground feature 2004 also has a U-shape. In this example, the ground feature 2004 does not follow the perimeter of at least a part of each of the sides of the first layer 2002.

Figure 31:
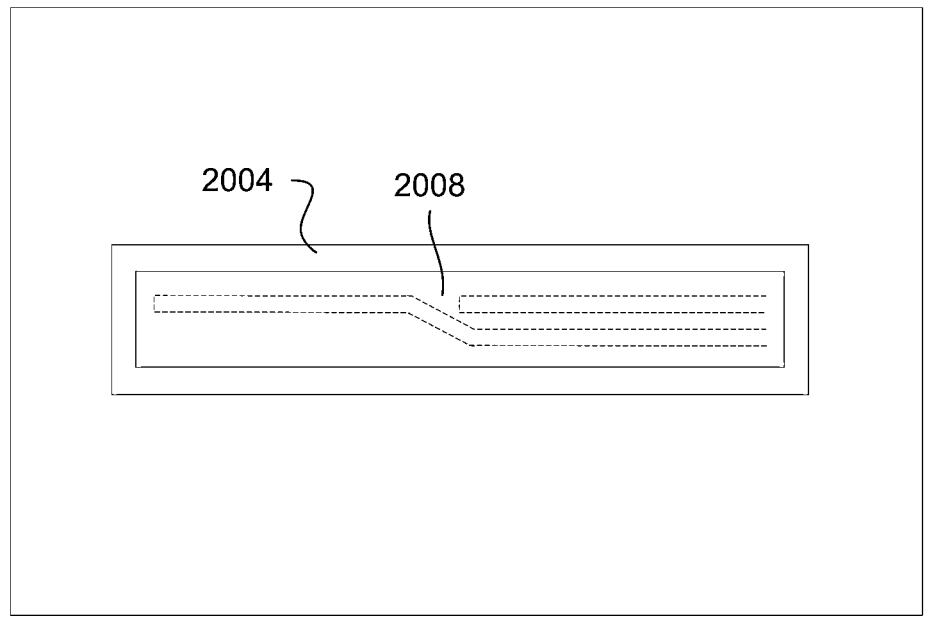
FIG. 31 depicts an example of a touch sensor in accordance with the disclosure.

FIG. 31 depicts an example of a ground feature 2004 where the ground feature 2004 surrounds a region 2008 of the first layer that corresponds and aligns with a section of the shield layer configured to allow antenna transmissions to pass through the shield layer and therefore the first layer of the touch pad stack. In this example, none of the ground feature covers a side of the first layer.

Figure 32:
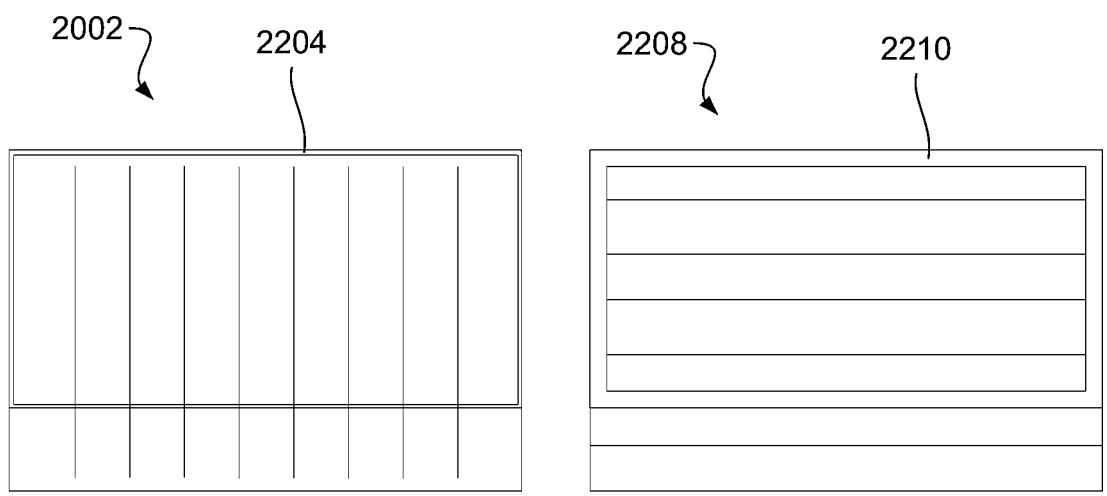
FIG. 32 depicts an example of layers of a touch sensor stack in accordance with the disclosure.

FIG. 32 depicts an example of a first layer 2002 and a second layer 2208. In this example, the first portion 2204 of the ground feature 2004 on the first layer 2002 has a smaller width than the second portion 2210 of the ground feature 2004 on the second layer 2208. While this example depicts that all the sides of the ground feature 2004 of the first portion 2204 have the same width, in other examples, the different sides of the same portion of the ground feature 2004 may include different widths, different thicknesses, different lengths, other different dimensions, or combinations thereof. Further, while this example depicts that the widths of the ground feature 2004 on different layers have different widths, in other examples, the different portions of the ground feature 2004 may have different widths, different thicknesses, different lengths, other different dimensions, or combinations thereof.

The examples above describe that the electrical characteristics of the shield may have different properties in one section and different properties in a different section. While the examples above describe such differences in electrical characteristics as having different degrees of ability to allow radio frequency to pass through the shield layer and that such differences are achieved through openings defined in the thickness of the shield layer, any appropriate electrical property may be used and any appropriate means for achieving such electrical properties may be used. For example, the shield layer may have sections with different electrical resistivity, electrical conductivity, electrical inductance, electrical impedance, electrical capacitance, different transmissivity, broadcasting abilities, other electrical properties, magnetic properties, or combinations thereof. Further, the means for achieving such electrical property differences may include, but are not limited to, using different shield materials, different material porosities, different shield thicknesses, different opening dimensions, different opening depths, different opening shapes, other physical differences that affect the electrical properties, or combinations thereof.

In some examples, the wireless signal is a Wi-Fi signal, a Bluetooth signal, a near field communication signal, a wireless signal with another radio frequency, or combinations thereof. The device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An apparatus, comprising:
    a touch sensor;
    the touch sensor having a first set of electrodes formed on a first layer and a second set of electrodes formed on a second layer that are electrically isolated from the first set of electrodes;
    a shield layer positioned adjacent to the touch sensor;
    the shield layer has a first section and a second section, the first section of the shield layer is solid and has the electrical characteristic of blocking all radio frequency transmissions, the second section of the shield layer has a number of openings defined through its thickness and has the electrical characteristic of allowing at least some radio frequency transmission to pass through the shield layer; and
    a ground feature incorporated into the touch sensor, a first portion of the ground feature is formed on the first layer, and a second portion of the ground feature is formed on the second layer;
    wherein the ground feature divides a first region of the touch sensor from a second region of the touch sensor, wherein the first region of the touch sensor aligns with the first section of the shield layer and the second region of the touch sensor aligns with the second section of the shield layer.

2. The apparatus of claim 1, wherein the first portion of the ground feature and the second portion of the ground feature are electrically connected to each other.

3. The apparatus of claim 1, wherein the first portion of the ground feature and the second portion of the ground feature have different widths.

4. The apparatus of claim 1, further including a pixel layer incorporated into a stack of layers that includes the touch sensor and the shield layer.

5. The apparatus of claim 1, wherein the second region of the touch sensor is adjacent to an antenna configured to direct a radio frequency signal through the second region of the touch sensor.

6. The apparatus of claim 1, further comprising:
    a component layer;
    a ground connection formed on the component layer configured to connect to a frame of a computing device;
    wherein the ground feature is electrically connected to the ground connection.

7. The apparatus of claim 1, wherein the ground feature is a ring that surrounds at least a region of the touch sensor.

8. The apparatus of claim 7, wherein only a portion of the ring is formed on a perimeter of the touch sensor.

9. The apparatus of claim 7, wherein the ring includes at least one discontinuity.

10. An apparatus, comprising:
    a touch sensor, the touch sensor having a first set of electrodes and a second set of electrodes that are electrically isolated from the first set of electrodes;
    a shield layer positioned adjacent to the touch sensor;
    the shield layer has a first section and a second section where the first section of the shield layer has a different electrical characteristic than the second section of the shield layer; and
    a ground feature incorporated into the touch sensor;
    wherein at least a portion of the ground feature divides a first region of the touch sensor from a second region of the touch sensor, wherein the first region of the touch sensor aligns with the first section of the shield layer and the second region of the touch sensor aligns with the second region of the shield layer;
    wherein the first section of the shield layer includes multiple openings defined in the thickness of the first section and the second section of the shield layer has a solid continuous area;
    wherein the first region of the touch sensor is adjacent to an antenna configured to direct a radio frequency signal through the first region of the touch sensor.

11. The apparatus of claim 10, further comprising:
    a component layer;
    a ground connection formed on the component layer configured to connect to a frame of a computing device;
    wherein the ground feature is electrically connected to the ground connection.

12. The apparatus of claim 10, wherein only a portion of the ring is formed on a perimeter of the touch sensor.

13. The apparatus of claim 10, wherein the ring includes at least one discontinuity.

* * * * *